US012800426B2

(12) United States Patent
Vanzetto

(10) Patent No.: US 12,800,426 B2
(45) Date of Patent: Nov. 17, 2026

(54) INDICATOR FOR INDICATING THE OCCURRENCE OF A PRESSURIZED FLUID LEAK IN A VENT CHAMBER OF A PRESSURIZED FLUID APPARATUS

(71) Applicant: EXEL INDUSTRIES, Epernay (FR)

(72) Inventor: Denis Vanzetto, Epernay (FR)

(73) Assignee: EXEL INDUSTRIES, Epernay (FR)

( * ) Notice: Subject to any disclaimer, the term of this patent is extended or adjusted under 35 U.S.C. 154(b) by 252 days.

(21) Appl. No.: 18/612,560

(22) Filed: Mar. 21, 2024

(65) Prior Publication Data

US 2024/0328889 A1 Oct. 3, 2024

(30) Foreign Application Priority Data

Mar. 28, 2023 (FR) ........................................ 2302951

(51) Int. Cl.

| | |
|---|---|
| ***G01M 3/28*** | (2006.01) |
| ***F16K 37/00*** | (2006.01) |
| ***G01L 7/16*** | (2006.01) |
| ***G01L 9/14*** | (2006.01) |
| ***G01L 19/06*** | (2006.01) |

(Continued)

(52) U.S. Cl.

CPC ........ *G01M 3/2876* (2013.01); *F16K 37/0008* (2013.01); *G01L 7/166* (2013.01); *G01L 9/14* (2013.01); *G01L 19/0618* (2013.01); *G01L 19/0672* (2013.01); *G01M 3/02* (2013.01); *G01M 3/04* (2013.01); *G01M 3/30* (2013.01); *G08B 21/18* (2013.01)

(58) Field of Classification Search

CPC ........ G01L 7/166; G01L 9/14; G01L 19/0618; G01L 19/0672; G01M 3/04; G01M 3/2876; G01M 3/30; G01M 3/02; F16K 37/0008; G08B 21/18

USPC .............................................................. 73/40

See application file for complete search history.

(56) References Cited

U.S. PATENT DOCUMENTS 2,713,986 A * 7/1955 Suthann .................... F16K 1/34 251/86
5,924,444 A * 7/1999 Fendel .................... F16K 15/20 137/538

(Continued)

FOREIGN PATENT DOCUMENTS

| | | | |
|---|---|---|---|
| EP | 1219942 | A1 | 7/2002 |
| EP | 3301423 | A1 | 4/2018 |

(Continued)

*Primary Examiner* — Peter J Macchiarolo
*Assistant Examiner* — Monica S Young
(74) *Attorney, Agent, or Firm* — Thompson Coburn LLP; Steven M. Ritchey

(57) ABSTRACT

An indicator, for indicating an occurrence of a leak of pressurized fluid in a vent chamber of a pressurized fluid apparatus, the indicator comprising a support tube, including a connection opening, fluidically connected to the vent chamber of the pressurized fluid apparatus, and an external opening, coming out to an outside. The indicator comprises a poppet, movable in the support tube, between an initial position and a signaling position, under the effect of an overpressure occurring at the connection opening, the poppet being positioned further from the connection opening in the signaling position than in the initial position, so as to indicate the occurrence of the leakage of pressurized fluid into the vent chamber when the poppet is in the signaling position.

16 Claims, 4 Drawing Sheets

(51) Int. Cl.

| | |
|---|---|
| ***G01M 3/02*** | (2006.01) |
| ***G01M 3/04*** | (2006.01) |
| ***G01M 3/30*** | (2006.01) |
| ***G08B 21/18*** | (2006.01) |

(56) References Cited

U.S. PATENT DOCUMENTS

2015/0122354 A1* 5/2015 Mills .................. F16K 37/0008
137/557
2021/0060599 A1* 3/2021 Vanzetto ............... F16K 31/122

FOREIGN PATENT DOCUMENTS

EP 3785802 A1 3/2021
FR 3100302 A1 3/2021
GB 2575991 A 2/2020

* cited by examiner

INDICATOR FOR INDICATING THE OCCURRENCE OF A PRESSURIZED FLUID LEAK IN A VENT CHAMBER OF A PRESSURIZED FLUID APPARATUS

CROSS-REFERENCE TO RELATED APPLICATIONS

This application claims the benefit of FR 2302951 filed on Mar. 28, 2023, which is incorporated herein by reference in its entirety.

FIELD OF THE INVENTION

The present invention relates to an indicator for indicating the occurrence of a leak of pressurized fluid in a vent chamber of a pressurized fluid apparatus and a pressurized fluid apparatus comprising such an indicator.

BACKGROUND OF THE INVENTION

FR3100302A1 relates to a system for applying a coating product, equipped with a valve. The valve comprises a body, with an internal central port and a chamber, and a piston, forming a rod mounted in the internal port and a piston head located in the chamber. A part of the valve chamber is filled with a pressurized command fluid so as to obtain, against the force of a spring housed in the body, a displacement of the piston with respect to the body. The valve is mounted in a bore of the application system, wherein pressurized coating material flows and wherein the movement of the rod permits or interrupts the flow of material. The valve further comprises a sealing device housed in the body around the rod of the piston, on one side of the valve where the rod of the piston continues out of the body.

The valve comprises a vent channel, provided in the rod of the piston and communicating with the internal central port, beyond the sealing device with respect to the bore, the vent channel communicating with the outside of the application system. In the event of a leakage of coating material through the sealing device, the leaking coating material is received in the vent channel and diverted to the outside of the valve by pressure difference with the outside of the system. The above limits the damage caused by the leak, in that the leak only affects the valve, which can be disassembled and repaired or replaced, without damaging the rest of the application system.

When the leak is from a coating product, a solvent or another liquid, the leak can usually be detected by the technician, who can visually find the presence of the leak on the machine. However, the leak detection only occurs after a relatively long period of time when the liquid has clogged, corroded and/or permanently damaged the valve, in that it is the fact that the valve has become inoperative that prompts the technician to look for a cause of the failure. The valve is then particularly difficult to repair and is usually replaced by a new valve. In some cases, the leak is detected so late that the product has invaded other parts of the machine, especially when the vent outlet is concealed under a cover.

When the leak involves an invisible or volatile fluid, e.g. an air leak, the technician usually does not detect the leak. Indeed, during operation, the operating noise of the machine can cover the noise of the leak as such. During a maintenance operation, the leak may not be detected because the fluids and the energies feeding the machine are cut off. The leak is usually detected late, when there is a significant loss of efficiency of the machine on which the valve is equipped.

It is such drawbacks that the invention intends to overcome by proposing a solution of early and certain detection of the occurrence of a fluid leak in a vent chamber of a pressurized fluid apparatus.

SUMMARY OF THE INVENTION

The subject matter of the invention is an indicator for indicating the occurrence of a leak of pressurized fluid in a vent chamber of a pressurized fluid apparatus. The indicator comprises a support tube, comprising: a connection opening, configured to be fluidically connected to the vent chamber of the pressurized fluid apparatus; and an external opening, configured to open to the outside with respect to the pressurized fluid apparatus. The indicator further comprises a poppet, arranged in the support tube and movable with respect to the support tube, between an initial position and a signaling position, under the effect of an overpressure occurring at the connection opening, compared with the external opening, the poppet being positioned further away from the connection opening in the signaling position than in the initial position, to indicate the occurrence of the leak of pressurized fluid into the vent chamber when the poppet is in the signaling position.

By means of the invention, a technician can immediately and reliably observe that a leak has occurred in the vent chamber, by observing the position of the indicator, irrespective of the pressurized fluid concerned. 'Vent chamber' refers to an internal volume of the pressurized fluid apparatus, consisting of one or a plurality of chambers and/or possibly one or a plurality of channels, the internal volume being specially designed to serve as a receptacle for the leakage of pressurized fluid into the apparatus, the internal volume being adjacent to a wall or component, such as a sealing device, which is known to be particularly prone to failures, whether untimely or related to the life of parts of the pressurized fluid apparatus, which may cause a leak of pressurized fluid. The implementation of the indicator makes possible an early detection of the leak in the vent chamber.

The invention applies particularly, but not only, to the case where the fluid forms a coating product and/or a command fluid, in particular oil or air and where the apparatus is a valve.

According to advantageous but non-mandatory aspects of the invention, the invention can incorporate one or a plurality of the following features, taken individually or according to any technically permissible combination.

Preferentially, the indicator includes a signaling end which: protrudes out of the external opening when the poppet is in the signaling position, so as to indicate the occurrence of the leak; and is at least partially retracted into the external opening when the poppet is in the initial position, so as to indicate the absence of any leak of pressurized fluid into the vent chamber.

Preferentially, the poppet is shaped for closing the support tube and thereby preventing any leak of pressurized fluid from the connection opening to the external opening, at least when the poppet is in the signaling position, preferentially also when the poppet is in the initial position.

Preferentially, the support tube comprises a primary axial surface facing toward the connection opening and arranged inside the support tube between the external opening and the connection opening. Preferentially, the poppet comprises a secondary axial surface oriented toward the primary axial surface, so that the poppet abuts against the support tube when the poppet is in the signaling position, by abutting the secondary axial surface against the primary axial surface.

Preferentially, the indicator comprises locking elements, for mechanically locking the poppet in position with respect to the support tube, when the poppet is in the signaling position.

Preferentially, the locking elements comprise an internal wall portion of the support tube and an external wall portion of the poppet, the internal wall portion and the external wall portion being shaped such that the external wall portion is received in conical engagement in the internal wall portion when the poppet is in the signaling position, to thereby lock the poppet in the signaling position.

Preferentially, the support tube comprises a primary means of attachment, preferentially an external thread, for the indicator to be fixedly received in a receiving port of the pressurized fluid apparatus.

A further subject matter of the invention is a pressurized fluid apparatus, comprising: the indicator as described hereinabove, the external opening of the indicator opening to the outside; the vent chamber, the connection opening of the indicator being fluidically connected to the vent chamber; at least one pressurized fluid chamber; and at least one sealing device, fluidically separating the vent chamber from said at least one pressurized fluid chamber.

Preferentially, the pressurized fluid apparatus comprises a valve, fluidically connected to the vent chamber or forming all or part of the vent chamber, and comprising: a body, having a distal end of the body and forming a central channel, coaxially letting through a central axis, the central channel having a distal end of the channel opening at the distal end of the body; and a piston, received in the central channel and configured to slide with respect to the body along the central axis and protruding out of the central channel at the distal end of the channel.

Preferentially, the central channel comprises an intermediate chamber which is fluidically connected to the vent chamber or which forms all or part of the vent chamber. Preferentially, the at least one sealing device comprises at least one piston sealing device, belonging to the valve, the piston sealing device radially connecting the piston to the body, such that the piston sealing device separates the intermediate chamber from the at least one pressurized fluid chamber.

Preferentially, the pressurized fluid apparatus comprises a base, including a bore wherein the body is received and fixedly attached, so as to form: the at least one pressurized fluid chamber defined by the bore and the valve, and a peripheral chamber defined by the bore and the body, radially with respect to the central axis, the peripheral chamber being adjacent to the pressurized fluid chamber and being fluidically connected to the vent chamber or forming all or part of the vent chamber. Preferentially, the at least one sealing device comprises a body sealing device interposed between the body and the base, such that the body sealing device separates the peripheral chamber from the at least one pressurized fluid chamber.

Preferentially, the indicator is mounted in the base, with the support tube fixedly attached to the base.

Preferentially, the indicator is mounted on the valve, with the support tube fixedly attached to the valve.

Preferentially, the indicator is mounted on the piston, with the support tube fixedly attached to a proximal baseplate belonging to the piston, the proximal baseplate being opposite the distal end of the body, such that the indicator is visible from the outside for at least one position of the piston with respect to the body and such that the position of the indicator with respect to the body reflects the position of the piston.

Preferentially, the pressurized fluid apparatus is an apparatus for applying a coating product. Preferentially, the pressurized fluid comprises the coating product and/or a valve command fluid.

Preferentially, the indicator comprises a sensor a state of which reflects the current position of the poppet with respect to the support tube. Preferentially, the pressurized fluid apparatus comprises an electronic monitoring unit to which the sensor is connected, and which is configured to issue an alert for the attention of a person when the state of the sensor reflects that the poppet is in the signaling position.

DESCRIPTION OF THE DRAWINGS

The invention will be better understood and other advantages thereof will appear more clearly in the light of the following description of examples according to the principle of the invention, with reference to the following drawings.

DETAILED DESCRIPTION OF THE INVENTION

Figure 1:
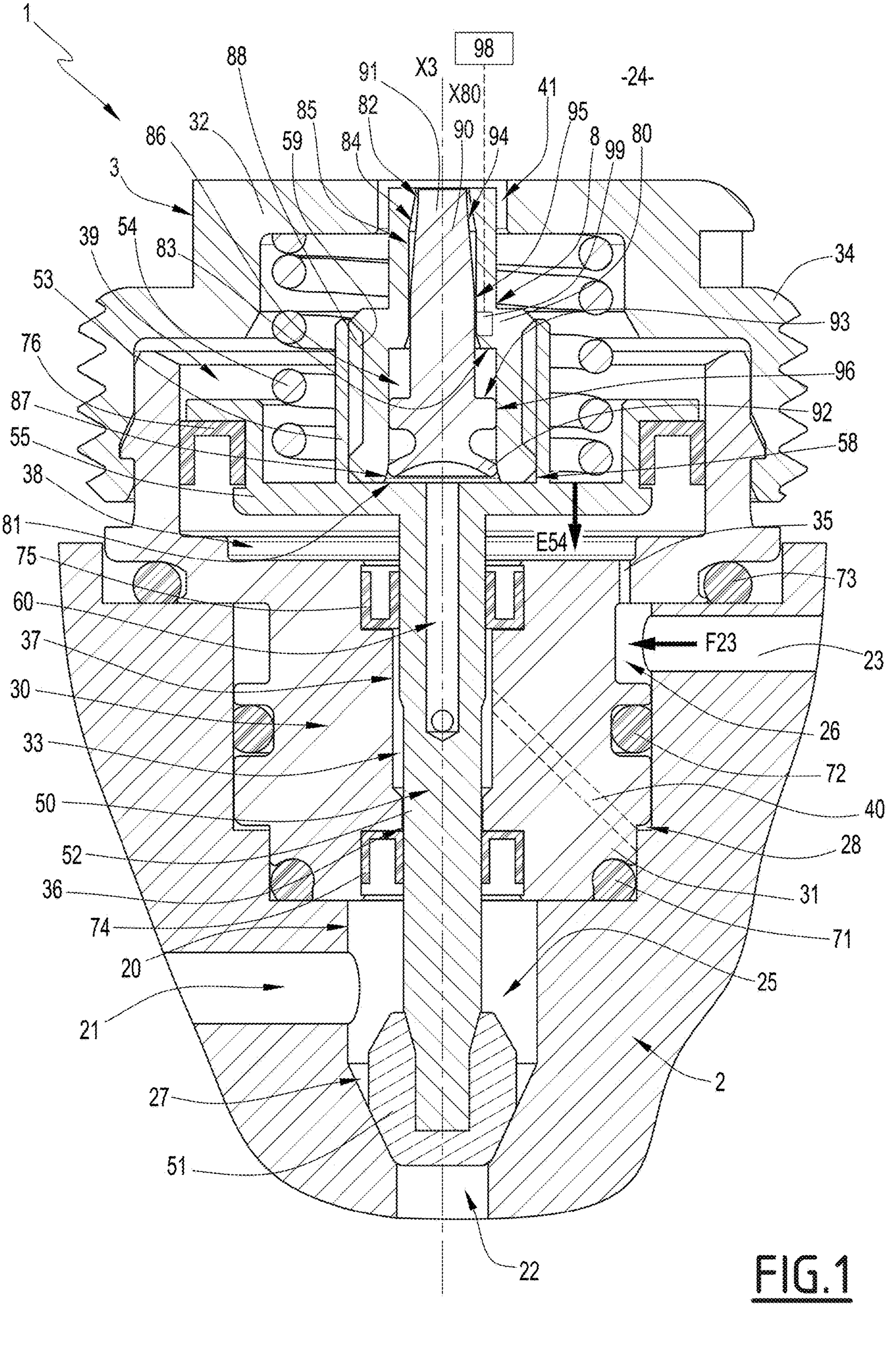
FIG. 1 is a longitudinal sectional view of a pressurized fluid apparatus including an indicator and a valve, according to a first embodiment of the invention, the valve being in a closed configuration and a poppet of the indicator being in an initial position.

FIGS. 1 to 4 show, in the context of pressurized fluid apparatus, an indicator 8. The indicator 8 is intended to indicate an occurrence of a leak of pressurized fluid in a vent chamber of the pressurized fluid apparatus, such as the apparatuses shown in FIGS. 1-4. In other words, the purpose of indicator 8 is to alert a technician that a leak has occurred in the vent chamber.

The indicator 8 comprises support tube 80 and a poppet 90.

The support tube 80 has a tubular shape, along a main axis X80 extending through the support tube 80. The support tube 80 comprises an opening 81, called a "connection opening", and an opening 82, called an "external opening", which are opposite and let through the axis X80. The openings 81 and 82 are connected by an internal channel delimited by the tube along the axis X80. The connection opening 81 is configured to be fluidically connected to the vent chamber of the pressurized fluid apparatus. The external opening 82 is configured to open to an outside with respect to the pressurized fluid apparatus, i.e. to the open air.

The poppet 90 is arranged inside the support tube 80, being received in the internal channel. The poppet 90 is movable in translation along the axis X80 with respect to the tube 80, between an initial position shown in FIGS. 1 and 2, and signaling position shown in FIG. 3. To provide such mobility, the tube 80 guides the poppet 90 sliding along the axis X80. From the initial position to the signaling position, the poppet 90 has moved along the axis X80, in a direction going from the connection opening 81 to the external opening 82. In other words, in the signaling position, the poppet 90 is positioned further away from the connection opening 81 than in the initial position.

The poppet 90 advantageously comprises a signaling end 91 and a thrust end 92 which are opposite and let through the axis X80. The signaling end 91 is arranged on the side of the external opening 82 and the thrust end 92 is arranged on the side of the connection opening 81.

The thrust end 92 advantageously occupies the entire internal cross-section of the tube 80 at the connection opening 81. Preferentially, as illustrated, the thrust end 92 has a recessed surface oriented towards the outside of the connection opening 81. More generally, the thrust end 92 and, in general, the poppet 90, is shaped so as to be moved from the initial position to the signaling position when an overpressure occurs at the connection opening 81, compared with the pressure prevailing at the external opening 82. Such overpressure, caused by a leak of pressurized fluid in the vent chamber, pushes the poppet 90 to the signaling position, bearing on the thrust end 92. In practice, the pressurized fluid as such, having leaked and entered the vent chamber, can flow to the thrust end 92 to push the poppet 90 directly to the signaling position.

Figure 2:
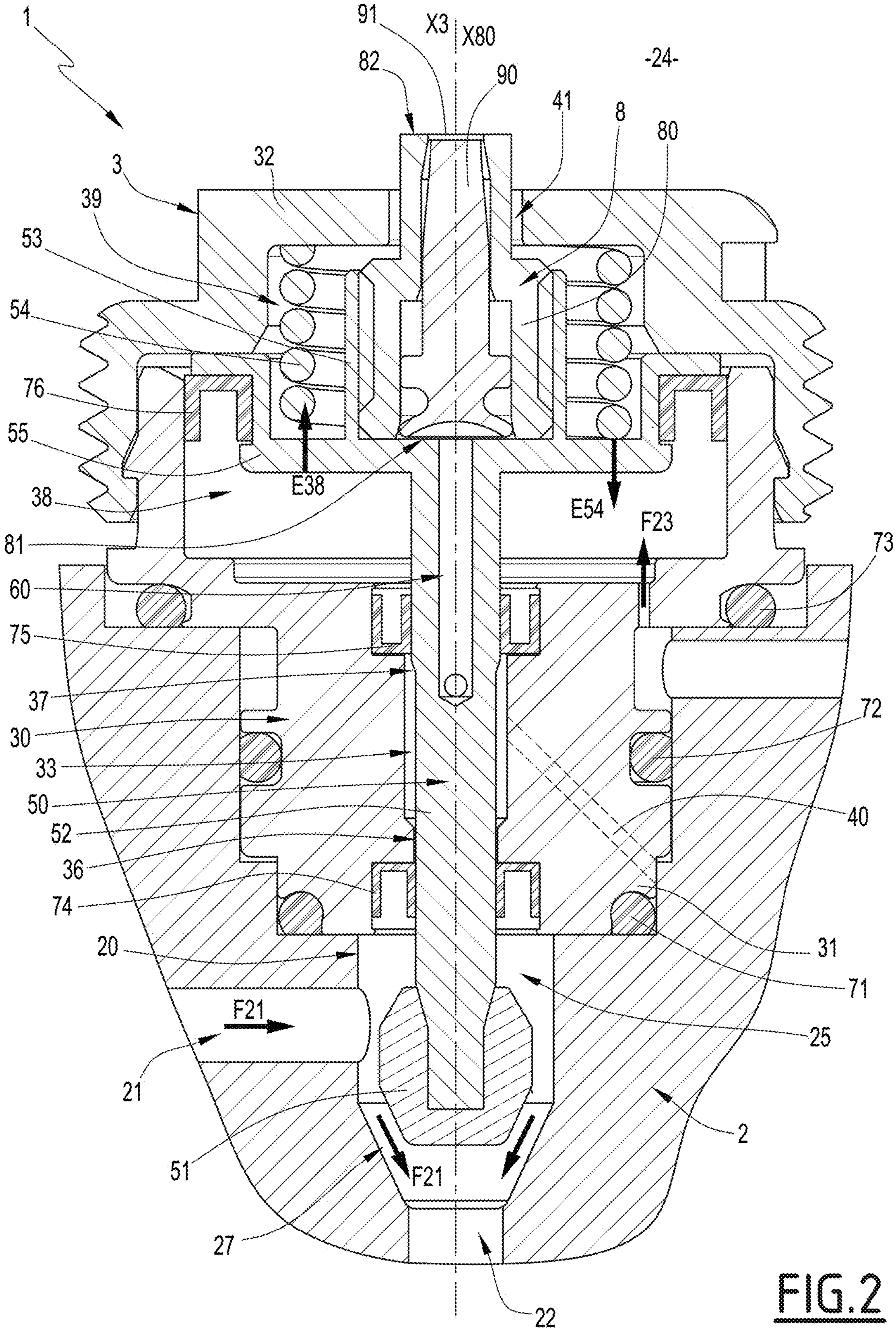
FIG. 2 is a view similar to the view shown in FIG. 1, where the valve is in an open configuration and the poppet is in the initial position.
Figure 3:
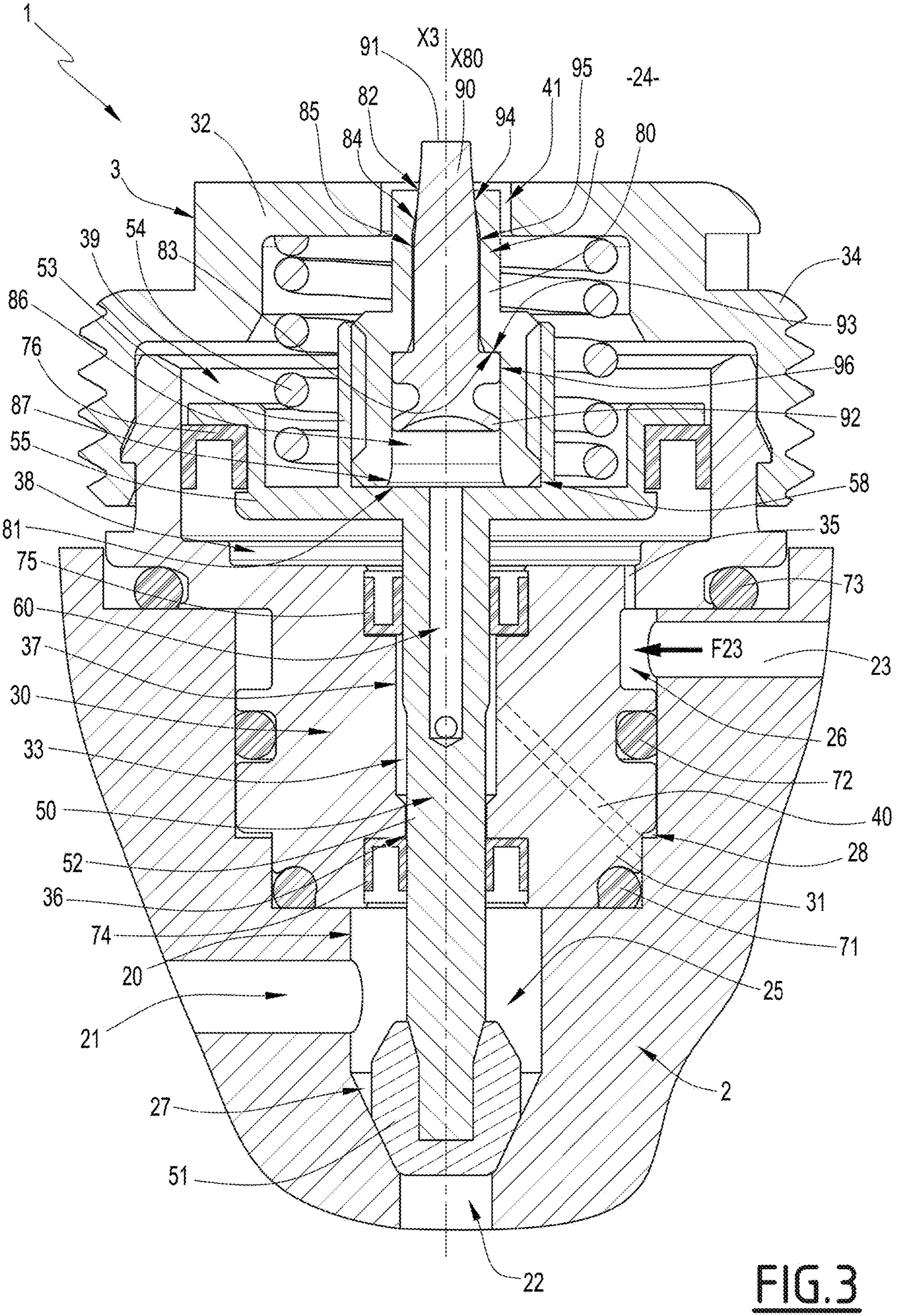
FIG. 3 is a view similar to the view shown in the preceding figures, where the valve is in the closed configuration and the poppet is in a signaling position.

When the poppet 90 is in the initial position as shown in FIGS. 1 and 2, the signaling end 91 is preferentially retracted into the external opening 82, which indicates to the technician that there has been no leak of pressurized fluid into the vent chamber. When the poppet 90 is in the signaling position, the signaling end 91 is visible through the opening 82, or preferentially extends beyond the opening 82 as shown in FIG. 3, which indicates to the technician the occurrence of the leak of pressurized fluid in the vent chamber.

Preferentially, the support tube 80 comprises an axial surface 83 called a "primary axial surface", oriented towards the connection opening 81 and arranged inside the support tube, between the external opening 82 and the connection opening 81. In practice, the surface 83 may be formed by a reduction in the internal diameter of the internal channel of the tube 80. The surface 83 is advantageously annular and extends around the axis X80. Complementarily, the poppet 90 advantageously comprises an axial surface 93, called a "secondary axial surface", oriented towards the primary axial surface 83 and the external opening 82. The surface 93 is e.g. formed on an external shoulder 96 of the poppet 90. The surface 93 is advantageously annular and extends around the axis X80. In the initial position, the surfaces 83 and 93 are spaced along the axis X80. In the signaling position, the surfaces 83 and 93 abut each other along the axis X80. In other words, the poppet 90 abuts, along the axis X80, against the support tube 80, when the poppet 90 is in the signaling position, by bringing the secondary axial surface 93 into abutment against the primary axial surface 83. Therefore, the overpressure applied to the poppet 90 cannot eject the poppet 90 out of the tube 80 via the external opening 82.

Preferentially, the internal channel of the support tube 80 has an internal wall portion 84 which extends from the external opening 82 towards the connection opening 81. The internal wall portion 84 is frusto-conical, centered on the axis X80 and convergent in the direction of the external opening 82. Complementarily, the poppet 90 has an external wall portion 94, which extends from the signaling end 91 towards the thrust end 92. The external wall portion 94 is frusto-conical, centered on the axis X80 and convergent in the direction of the signaling end 91. In a variant, only one of the wall portions 84 and 94 is frusto-conical, whereas the other may have a different shape, e.g. cylindro-conical.

In the initial position, the wall portions 84 and 94 are distant and thus do not oppose the motion of the poppet 90 in the tube 80. In the signaling position, the wall portion 94 comes into conical engagement in the wall portion 84, which locks the poppet 90 in the signaling position. In other words, by cooperation of the wall portions 84 and 94, the poppet 90 gets stuck in the signaling position. The wall portions 84 and 94 thus form locking elements belonging to the indicator, for mechanically locking the poppet 90 in position with respect to the support tube 80 when the poppet 90 is in the signaling position. Once the signal position has been reached, the poppet 90 cannot hence return to the initial position, even if the overpressure in the vent chamber is interrupted. It is advantageously provided that a person can return the poppet 90 to the initial position thereof by manually pushing on the poppet 90. The above can be done e.g. if the pressurized fluid device has been repaired and cleaned, and hence there is no longer any leak.

Preferentially, the tube 80 comprises an internal cylindrical surface 85, centered on the axis X80, which connects the wall portion 84 to the surface 83. Preferentially, the tube 80 comprises an internal cylindrical surface 86, centered on the axis X84, which connects the surface 83 to the connection opening 81. Preferentially, the cylindrical surface 86 has a larger diameter than the surface 85. Preferentially, the poppet 90 comprises an external cylindrical surface 95, centered on the axis X0, which connects the wall portion 94 to the surface 93 formed by the external shoulder 96. The shoulder 96 has a larger diameter than the surface 95. Preferentially, the sliding of the poppet 90 in the tube 80 is guided by the sliding of the shoulder 96 in the internal cylindrical surface 86. The sliding may alternatively or additionally be guided by sliding the external cylindrical surface 95 in the internal cylindrical surface 85. It could also be preferable, as illustrated, for a radial clearance to be provided between the surfaces 85 and 95.

Alternatively, or in addition to the locking of the wall portions 84 and 94, provision can be made for the locking to be achieved by cooperation of the end 92 with the internal cylindrical surface 86. For this purpose, provision is made e.g. for the end 92 to have a diameter adjusted to the diameter of the surface 86, so that the end 92 adheres and/or rubs against the surface 86 radially when the poppet 90 reaches the signaling position. Preferentially, the internal channel of the support tube 80 has an internal wall portion 87 which connects the connection opening 81 to the internal cylindrical surface 86, being centered on the axis X80 and converging towards the external opening 82. In the initial position, the end 92 of the poppet is positioned in the portion 87, which provides a radial clearance between the portion 87 and the end 92, so that the end 92 does not lock the poppet 90 in the initial position. When the poppet 90 is moved towards the signaling position, the end 92 comes into adjusted radial contact with the internal cylindrical surface 86, which locks the poppet 90.

Preferentially, the poppet 90 is shaped so as to close off the internal channel of the support tube 80 and thereby prevent a leak of pressurized fluid through the tube 80, from the connection opening 81 to the external opening 82. Such closing is preferentially obtained when the poppet 90 is in the signaling position. To this end, as shown in FIG. 3, it is possible to provide for the poppet 90 to close the internal channel of the tube 80 at least for the signaling position.

Preferentially, the poppet 90 closes the tube 80 by means of a radial engagement of the end 92 with the internal cylindrical surface 86 when the poppet 90 is in the signaling position. When the poppet 90 is in the initial position, the internal channel of the tube 80 is advantageously not closed, in that the end 92 is arranged at the height of the portion 87, so that a radial clearance is provided between the end 92 and the portion 87.

Alternatively or additionally, the closing can be obtained by the engagement of the locking elements in the signaling position, in particular the conical engagement of the wall portions 84 and 94. However, provision may also be made for the closing to take place also when the poppet 90 is in the initial position.

Whatever the solution adopted, provision is made for the closing to prevent or limit a leak of liquid pressurized fluid, in particular a coating product, through the tube 80, while permitting a leak of air or gas through the tube 80. Alternatively, provision is made for the closing to permit a leak of liquid pressurized fluid, but serves to limit same, in order to reduce the risk of forming a jet of liquid through the tube 80 when the leak occurs.

Preferentially, the tube 80 comprises a means of attachment 88, called a "primary means of attachment", which is formed on the outside of the tube 80. For example, the above is an external thread centered on axis X80. The external thread is herein formed from the connection opening 81. The primary means of attachment 88 is configured so that the indicator 8 can be fixedly received in a receiving port of the pressurized fluid apparatus, including a means of attachment, called "secondary means of attachment", matching said primary means of attachment, in particular an internal thread. The primary means of attachment means 88 is configured so that the tube 80 is attached in the receiving port of the pressurized fluid apparatus with the opening 81 oriented towards the inside of the receiving port, so as to be connected to the vent chamber and the opening 82 oriented towards the outside of the receiving port, so as end on the outside of the device.

In a variant, the primary and secondary means of attachment are means for clipping the tube 80 onto the pressurized fluid apparatus. Other solutions are possible, e.g. an attachment by bonding.

Hereinafter, the integration of the indicator 8 into a pressurized fluid apparatus is described.

FIGS. 1 to 3 represent a part of an apparatus 1 for applying a coating product. The apparatus 1 is e.g. a sprayer for paint, varnish, anticorrosion coating, or for any other type of coating product that can be envisaged. The apparatus 1 is a particular type of pressurized fluid apparatus, using at least two pressurized fluids, namely the coating product or other products used in the context of the coating, e.g. a solvent or constituents of the coating product, and a command fluid, e.g. compressed air. The coating product is a pressurized fluid in that same is used under a pressure of between 1 and 16 bar, preferentially between 2 and 10 bar, in the apparatus 1. The above also applies in the case of a solvent or of a constituent of coating product. The command fluid is a pressurized fluid in that same is used under a pressure of between 1 and 10 bar, preferentially between 2 and 6 bar in the apparatus 1.

The apparatus 1 comprises a base 2, a valve 3 and the indicator 8. The indicator 8 is particularly suitable for being used with the apparatus 1 and the valve 3 described hereinafter but can also be used with other types of pressurized fluid apparatuses, such as pneumatic or hydraulic apparatuses, using one or a plurality of pressurized fluids other than same described herein.

The base 2 forms a bore 20, an inlet channel 21 for the coating product, a discharge channel 22 for the coating product, and a channel 23 for the circulation of a command fluid, the channels 21, 22 and 23 coming out into the bore 20. The bore 20 opens into an outside 24 of the apparatus 1, i.e. is advantageously open to the open air. The valve 3 is fixedly received in the bore 20 by closing the bore 20. The valve 3 and the bore 20 define a common central axis X3. The central axis X3 runs through the bore 20 from the opening to the bottom of the bore. In the present case, the discharge channel 22 is centered on the axis X3. Unless otherwise stated, terms such as "distal", "proximal", "radially" and "axially" are indicated with reference to the axis X3.

The channels 21 and 22 open into a zone of the bore 20 which delimits a chamber 25 for the coating product, the solvent or the constituent of the coating product. The axis X3 runs through the chamber 25 which is preferentially located at the bottom of the bore 20. The chamber 25 is thus a chamber for a pressurized fluid, herein the coating product or one of the other aforementioned products. A closing seat 27 is formed at the opening of the channel 22 into the chamber 25, herein coaxially with the axis X3. As shown in FIG. 2, a flow F21 of pressurized fluid, which is herein a coating product, but which could be another fluid such as air, is intended to circulate successively in the channel 21, the chamber 25 and the channel 22, via the seat 27, when the valve 3 is in an open configuration. When the valve 3 is in a closed configuration as shown in FIGS. 1 and 3, the flow F21 is interrupted by the valve 3, which closes the seat 27.

The channel 23 opens into a zone of the bore 20 which delimits a chamber 26, called a "peripheral command chamber", which extends between the chamber 25 and the opening of the bore 20 to the outside 24. As shown in FIGS. 1 and 2, in order to mechanically command the valve 3, a flow F23 of command fluid circulates between the channel 23 and the peripheral command chamber 26. The chamber 26 is thus a chamber for a pressurized fluid, namely the command fluid.

The valve 3 comprises a body 30. The central axis X3 is fixed with respect to the body 30. Along the axis X3, the body 30 has a distal end 31 called "distal end of the body" and a proximal end 32 called "proximal end of the body" which are opposite and let through the axis X3.

The valve 3 is received and attached in the bore 20 by means of the body 30.

Thereby received, the body distal end 31 is arranged at the bottom of the bore 20 and delimits, with the bore 20 of the base 2, the chamber 25.

The body proximal end 32 is arranged at the emerging of the bore 20, opening onto the outside 24. The command chamber 26 is delimited radially between the body 30 and the bore 20 of the base 2, at the height of the outlet of the channel 23. Another chamber 28, called a "peripheral chamber", is delimited radially between the body 30 and the bore 20 of the base 2, axially between the chamber 25 and the chamber 26.

In order to be attached to the bore 20, the body 30 advantageously comprises an external thread 34, herein centered on the axis X3, or any other appropriate means of attachment, cooperating with a matching means of attachment belonging to the base 2, herein an internal thread (not shown) matching the external thread 34, formed inside the bore 20 near the opening out. In the example, the thread 34 is arranged at the proximal end 32. More particularly, the thread 34 is arranged between the proximal end 32 and the command chamber 26.

In order to delimit the chamber 25 in a leak-tight way with regard to the coating product, the valve 3 advantageously comprises a sealing device 71, called a "body sealing device". The sealing device 71 is herein in the form of a static sealing gasket, e.g. an O-ring, which surrounds the body 30 over throughout the periphery thereof, around the axis X30. The sealing device 71 is interposed between the body 30 and the base 2, herein between the body 30 and the bore 20, radially with respect to the axis X30. The device 71 thereby separates the chamber 25 from the rest of the bore 20, in order to prevent coating product coming from the chamber 25, from escaping to the outside 24 via the opening of the bore 20 along the body 30. More particularly, the device 71 is arranged axially between the channels 21 and 23. More particularly, the device 71 fluidically separates the chamber 25 from the chamber 28, which are adjacent to said device 71. The device 71 thus prevents a leak of coating product from the chamber 25 towards the chamber 28, or even towards the command chamber 26.

In order to delimit the chamber 26 in leak-tight way with regard to the command fluid, the valve 3 advantageously comprises a sealing device 72 and a sealing device 73. The chamber 26 is axially delimited by the devices 72 and 73, extending between the devices 72 and 73. The chamber 28 is axially delimited by the devices 71 and 72, extending between the devices 71 and 72.

Herein, the sealing devices 72 and 73 are each in the form of a static seal, e.g. an O-ring. Each sealing device 72 and 73 surrounds the body 30 throughout the periphery thereof, around the axis X30. Each sealing device 72 and 73 is interposed between the body 30 and the base 2, herein between the body 30 and the bore 20, radially with respect to the axis X30. More particularly, the sealing device 72, called a "body sealing device", is arranged axially between the sealing device 71 and the sealing device 73. More particularly, the sealing device 72 is arranged axially between the channel 23 and the sealing device 71. The device 72 fluidically separates the chamber 26 from the chamber 28, which are adjacent to the device 72, to prevent command fluid coming from the chamber 26, from escaping right to the chamber 28, or even right to the chamber 25, by flowing along the body 30. The sealing device 73 separates the chamber 26 from the opening of the bore 20. More particularly, the device 73 is arranged axially between the thread 34 or means of attachment and the channel 23. The device 73 thus prevents a leak of command fluid from the chamber 26 towards the thread 34, or even towards the outside 24.

The body 30 forms a central channel 33 which is coaxial with the axis X3 and lets through the axis X3 throughout the length thereof. The channel 33 runs right through the body 30. The central channel 33 opens out at the body distal end 31 and at the body proximal end 32.

At the body distal end 31, the central channel 33 defines a distal end of the channel 36, which ends the central channel 33 and which opens out at the body distal end 31. Starting from the end 36, and successively along the axis X3, the central channel 33 advantageously delimits, inside the body 30, an intermediate chamber 37, a command chamber 38 and a proximal chamber 39. The axis X3 runs through the chambers 37, 38 and 39.

The valve 3 further comprises a piston 50. The piston 50 is received in the central channel 33 and is configured to slide with respect to the body 30 along the axis X3, being guided by the central channel 33 for the sliding. The piston 50 slides between a closed position, so as to obtain the closed configuration of the valve 3 shown in FIGS. 1 and 3, and an open position, so as to obtain the open configuration of the valve 3 shown in FIG. 2.

The piston 50 advantageously comprises, successively along the axis X3, a distal head 51, a rod 52, a collar 55 and a proximal baseplate 53.

The piston 50 emerges from the central channel 33, at the distal end of the channel 36, into the chamber 25. The head 51 of the piston 50 is arranged in the chamber 25, at a distal end of the piston 50, and lets through the axis X3. The head 51, in the open position of the piston 50, is distant from the seat 27 in order to allow the flow F21 to flow, and, in the closed position of the piston 50, bears axially against the seat 27 in order to close the channel 22 and prevent the circulation of the flow F21.

The rod 52 connects the head 51 to the collar 55. The rod 52 is mounted on the head 51 in the chamber 25. The rod 52 emerges into the chamber 25, then successively runs through the distal end of the channel 36 and the intermediate chamber 37 and emerges into the command chamber 38. Preferentially, the piston 50 is guided in sliding by radial sliding of the rod 52 along a wall of the intermediate chamber 37.

The rod 52 is linked to the collar 55 in the command chamber 38. The collar 55 links the rod 52 to the proximal baseplate 53, separating the command chamber 38 from the proximal chamber 39.

The proximal baseplate 53, formed at a proximal end of the piston 50, is opposite the distal head 51. The proximal baseplate 53 is arranged in the proximal chamber 39.

The valve advantageously comprises sealing devices 74, 75 and 76. Each sealing device 74, 75 and 76 extends radially between the channel 33 and the piston 50, in order to fluidically separate the chambers 25, 37, 38 and 39 from one another and to delimit said chambers 25, 37, 38 and 39 axially. The sealing devices 74, 75 and 76 are dynamic sealing devices, between the fixed body 30 and the movable piston 50.

The sealing device 74, called a "piston sealing device", is herein in the form of a wiper seal, attached to the body 30 and sliding along the piston 50. However, same could be in the form of a bellows or a diaphragm, attached both to the body 30 and to the piston 50. In any case, the device 74 surrounds the piston 50 throughout the periphery thereof and is interposed radially between the piston 50 and the body 30, more particularly the channel 33. More particularly, the device 74 radially links the piston 50 to the body distal end 31. Herein, the device 74 is attached to the body distal end 31, and the rod 52 of the piston slides inside the device 74. In the case of a bellows or a diaphragm, provision could be made for the device 74 to be attached both to the body distal end 31 and to either the rod 52 or the head 51. In such case, further provision can be made for the head to be formed by the device 74 as such.

The sealing device 74 fluidically separates the chamber 25 from the channel 33, which are adjacent to the sealing device 74. More particularly, the sealing device 74 separates the chambers 25 and 37 which are adjacent thereto. The pressurized fluid, herein the coating product, taken into the chamber 25, is prevented from leaking towards the intermediate chamber 37 by means of the sealing device 74.

The sealing device 75, called a "piston sealing device", is herein in the form of a wiper seal, attached to the body 30 and sliding along the piston 50. The device 75 surrounds the piston 50 throughout the periphery thereof and is interposed radially between the piston 50 and the body 30, more particularly the channel 33. More particularly, the device 75 radially connects the rod 52 to a part of the channel 33 located at the intersection between the intermediate chamber 37 and the command chamber 38. The sealing device 75 fluidically separates the chambers 37 and 38 from the channel 33, which are adjacent to the sealing device 75.

The sealing device 76 is herein in the form of a wiper seal, attached to the piston 50 and sliding along the body 30. The device 76 surrounds the piston 50 throughout the periphery thereof and is interposed radially between the piston 50 and the body 30, more particularly the channel 33. More particularly, the device 76 radially connects the collar 55 to a part of the channel 33 located at the intersection between the command chamber 38 and the proximal chamber 39. The sealing device 76 fluidically separates the chambers 38 and 39 from the channel 33, which are adjacent to the sealing device 76.

The valve 3 advantageously comprises a spring 54, which exerts an elastic return force E54 on the piston 50, herein by means of the proximal baseplate 53, bearing on the body 30. The elastic return force E54 is herein oriented parallel to the axis X3. The elastic return force E54 tends to move the piston 50 from the open position thereof to the closed position thereof. Preferentially, the spring 54 is arranged inside the body 30, herein in the proximal chamber 39, around the piston 50. The spring 54 is e.g. a compression spring interposed between a wall belonging to the body proximal end 32 and the baseplate 53.

The channel 23 and the command chamber 26, delimited by the base 2, are fluidically connected to the command chamber 38 formed inside the body 30. To this end, the body 30 provides one or a plurality of channels 35, connecting the chambers 26 and 38 when the valve 3 is mounted on the base 2. The command fluid F23 can thus enter the command chambers 26 and 38, and thereby exert a pressure force E38 on the collar 55 by pressurizing the chamber 38, tending to move the piston 50 from the closed position to the open position, against the force E54 developed by the spring 54. The application of the force E38 by pressurizing the command fluid sets the piston 50 in the open position, the release of the force E38 by lowering the pressure allows the spring 54 to return the piston 50 to the closed position, by means of to the force E54. Thereby, the opening and the closing can be commanded. The command fluid received in the command chamber 38 is prevented from leaking to the outside 24 by means of the sealing device 76, of the channel 33 and of the piston 50 delimiting the chamber 38. The command fluid received in the command chamber 38 is prevented from leaking towards the intermediate chamber 37 by means of the sealing device 75, the channel 33 and the piston 50 delimiting the chamber 38.

Preferentially, the peripheral chamber 28, delimited by the body 30 and the base 2, is fluidically connected to the intermediate chamber 37, delimited inside the body 30. To this end, the body 30 provides one or a plurality of channels 40, connecting the chambers 28 and 37 when the valve 3 is mounted on the base 2. One of the channels 40, outside the sectional plane of FIGS. 1 to 3, is shown by transparency in broken lines in FIG. 1.

The intermediate chamber 37, the peripheral chamber 28 and the channel or channels 40 then together form a vent chamber. Indeed, in the event of failure of one of the sealing devices 71 or 74, pressurized fluid, namely coating product, coming from the chamber 25, leaks into the vent chamber. In the event of failure of the device 71, or incorrect mounting of the body 30 in the bore 20, the coating product leaks into the chamber 37, i.e. into the vent chamber. In the event of failure of the device 74, the coating product leaks into the chamber 28, i.e. into the vent chamber. Similarly, in the event of failure of one of the sealing devices 72 and 75, pressurized fluid, namely command fluid, coming from one of the command chambers 26 and 38 leaks into the vent chamber. In the event of failure of the device 75, the command fluid leaks into the chamber 37 belonging to the vent chamber. In the event of failure of the device 72, or of incorrect mounting of the body 30 in the bore 20, the command fluid leaks into the chamber 28 belonging to the vent chamber.

In the present example, it is provided for that the chambers 28 and 37 belong to the vent chamber. However, provision could be made for the vent chamber to be formed elsewhere and for the chamber 28 and/or the chamber 37 to be fluidically connected thereto.

Preferentially, the piston 50 comprises a receiving port 58 for receiving the indicator 8. Herein, the receiving port 58 is formed inside the proximal baseplate 53, along the axis X3, being open in the opposite direction from the distal head 51. For example, the port 58 is open into the proximal chamber 39. Provision is advantageously made for the proximal chamber 39 to be open out to the outside 24, the channel 33 ending in a proximal through port 41 provided through the proximal end 32 and emerging to the outside 24. The port 41 is preferentially centered on the axis X3.

The receiving port 58 is designed to fixedly receive the indicator 8, the tube 80 being fixedly received in the port 58, so as to be fixedly rigidly attached to the piston 50. The axis X80 is then advantageously coaxial with the axis X3. For attaching the tube 80, the receiving port 58 supports a secondary means of attachment 59, herein e.g. an internal thread, cooperating with the primary means of attachment 88 of the tube 80. The connection opening 81 is oriented towards the bottom of the receiving port 58 while the external opening 82 is directed towards the outside 24, and preferentially opens from the body 30, to the outside 24, through the port 41, at least for the signaling position.

The indicator 8 being thereby attached to the proximal baseplate 53, the position of the indicator 8 reflects the position of the piston 50. The indicator 8 moves at the same time as the piston 50, and thereby serves as an indication of the position of the piston 50. To this end, while the piston 50 is not visible or only slightly visible from the outside 24, the indicator 8 protrudes from the body 30, at least when the piston 50 is in the open position. The position of the indicator 8 with respect to the body 30 then informs a technician about the current position of the piston 50. The indicator 8 thus serves to indicate not only the occurrence of a leak, if appropriate, but also the current position of the piston 50.

The piston 50 advantageously comprises a through internal channel 60 which connects the bottom of the receiving port 58 to the intermediate chamber 37, i.e. to the vent chamber. To this end, the internal channel 60 advantageously comprises a part coaxial with the axis X3, which extends from the bottom of the receiving port 58 to the height of the chamber 37, and a radial part, which opens both into the chamber 37 and into the coaxial part of the channel 60. The internal channel 60 thus provides a fluidic connection between the connection opening 81 of the indicator and the chamber 37, namely the vent chamber.

In the event of a leak of pressurized fluid in the vent chamber, the overpressure caused is transmitted to the poppet 90 via the channel 60 and sets the poppet in the signaling position.

In a variant, the receiving port 58 could have been formed on the body 30, being fluidically connected to the vent chamber. To this end, an internal channel is e.g. provided, connecting the receiving port formed on the body 30 and the intermediate chamber 37.

Optionally, the indicator 8 comprises a sensor 99, a state of which, in particular an electrical state, reflects the current position of the poppet 90 with respect to the support tube 80. The sensor 99 is schematically shown only in FIG. 1. The state of the sensor is used to determine whether the poppet 90 is in the signaling position or in the initial position. For example, the sensor 99 is a Hall effect sensor, positioned on the support tube 80, the state of which varies depending on the position of the poppet 90, the poppet 90 embedding for such purpose a ferromagnetic element to which the sensor 99 is sensitive. In a variant, the sensor is a magnetic, pneumatic, optical or mechanical sensor. The apparatus 1 then comprises an electronic monitoring unit 98, to which the sensor 99 is connected, e.g. wired or wireless. The electronic monitoring unit 98 is configured to communicate to the technician the position of the poppet 90 detected by the sensor 99, e.g. in the form of an alert when the poppet 90 is in the signaling position. The alert can e.g. be issued in audio or visual form or be transmitted to the technician via a human-machine interface, such as a computer or smartphone, available to the technician.

Figure 4:
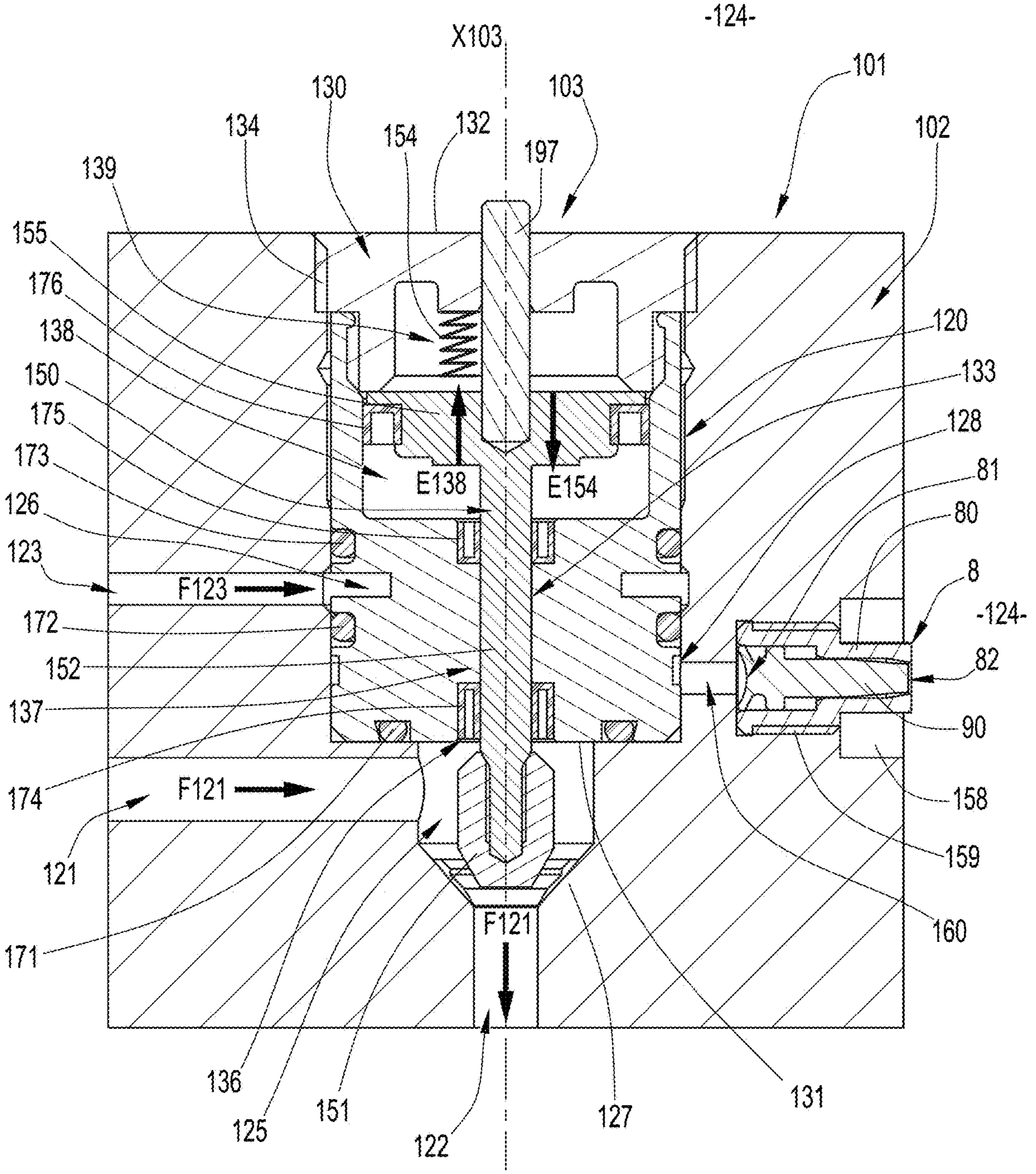
FIG. 4 is a longitudinal sectional view of a pressurized fluid apparatus including an indicator and a valve, according to a second embodiment of the invention, the valve being in an open configuration and a poppet of the indicator being in an initial position.

FIG. 4 shows another embodiment wherein the receiving port is not mounted on the valve, but on the body of the pressurized fluid apparatus.

In FIG. 4, the elements of the apparatus which correspond to the elements already described in FIGS. 1-3 have reference signs increased by 100. Identical elements have the same reference symbols. The description of FIG. 4 focuses essentially on the differences between the embodiment shown FIG. 4 and the embodiment shown in FIGS. 1-3. Most of the common elements are thus not described again in detail.

FIG. 4 shows a pressurized fluid apparatus 101, with a base 102, a valve 103 operating according to the same principles as for the apparatus 1 and comprising the same indicator 8 as the indicator shown in FIGS. 1-3.

The base 102 forms a bore 120, an inlet channel 121 for the coating product, a discharge channel 122 for the coating product, and a channel 123 for the circulation of a command fluid, the channels 121, 122 and 123 coming out into the bore 120. The bore 120 opens to an outside 124. The valve 103 is fixedly received in the bore 120 by closing the bore 120. The valve 103 and the bore 120 define a common central axis X103.

The channels 121 and 122 open into a zone of the bore 120 which delimits a chamber 125 for the pressurized fluid, herein a coating product. A closing seat 127 is formed at the opening out of the channel 122 into the chamber 125. A flow F121 of pressurized fluid circulates successively in the channel 121, the chamber 125 and the channel 122, via the seat 127, when the valve 103 is in an open configuration as shown in FIG. 4. When the valve 103 is in a closed configuration, the flow F121 is interrupted by the valve 103, by closing the seat 127.

The channel 123 opens into a zone of the bore 120 which delimits a peripheral command chamber 126 which extends between the chamber 125 and the opening of the bore 120 to the outside 124. A flow F123 of command fluid circulates between the channel 123 and the chamber 126 in order to mechanically poppet the valve 103.

The valve 103 comprises a body 130. The body 130 has a distal end 131 called a "distal end of the body" and a proximal end 132 called a "proximal end of the body" which are opposite and let through the axis X103.

The valve 103 is received and attached in the bore 120, by means of the body 130, with the body distal end 131 arranged at the bottom of the bore 120 and delimiting, along with the bore 120, the chamber 125.

The body proximal end 132 is arranged at the opening of the bore 120, opening to the outside 124. The command chamber 126 is delimited radially between the body 130 and the bore 120, at the height of the opening out of the channel 123. Another chamber 128, called the "peripheral chamber", is delimited radially between the body 130 and the bore 120, axially between the chamber 125 and the chamber 126.

In order to be attached to the bore 120, the body 130 advantageously comprises an external thread 134, cooperating with a matching internal thread formed in the bore 120. The thread 134 is advantageously arranged between the proximal end 132 and the command chamber 126.

In order to delimit the chamber 125 in a leak-tight way with regard to the coating product, the valve 103 advantageously comprises a sealing device 171, called a "body sealing device". The sealing device 171 is herein in the form of a static seal, e.g. an O-ring, which surrounds the axis X130. The sealing device 171 is interposed axially between the body 130 and the bore 120. The device 171 thereby separates the chamber 125 from the rest of the bore 120. More particularly, the device 171 fluidically separates the chamber 125 from the chamber 128, which are adjacent to said device 171. The device 171 thus prevents a leak of coating product from the chamber 125 towards the chamber 128, or even towards the command chamber 126.

In order to delimit the chamber 126 in leak-tight way with regard to the command fluid, the valve 103 advantageously comprises a sealing device 172 and a sealing device 173. The chamber 126 is axially delimited by the devices 172 and 173, extending between the devices 172 and 173. The chamber 128 is axially delimited by the devices 171 and 172, extending between the devices 171 and 172.

The sealing devices 172 and 173 are each herein in the form of a static seal, e.g. an O-ring. Each sealing device 172 and 173 surrounds the body 130 throughout the periphery thereof, around the axis X130. Each sealing device 172 and 173 is interposed between the body 130 and the bore 120. More particularly, the sealing device 172, called a "body sealing device", is arranged axially between the sealing device 171 and the sealing device 173. More particularly, the sealing device 172 is arranged axially between the channel 123 and the sealing device 171. The device 172 fluidically separates the chamber 126 from the chamber 128, which are adjacent to the device 172, to prevent command fluid coming from the chamber 126 from escaping right to the chamber 128, or even right to the chamber 125. The sealing device 173 separates the chamber 126 from the opening of the bore 120. More particularly, the device 173 is arranged axially between the thread 134 and the channel 123. The device 173 thus prevents a leak of command fluid from the chamber 126 towards the outside 124.

The body 130 forms a central channel 133, which is coaxial with the axis X103 and extends through the body 130, coming out at the body distal end 131.

At the body distal end 131, the central channel 133 defines a channel distal end 136, which ends the central channel 133 and which opens out at the body distal end 131. The central channel 133 advantageously delimits, inside the body 130, an intermediate chamber 137, a command chamber 138 and a proximal chamber 139.

The valve 103 further comprises a piston 150. The piston 150 is received in the central channel 133 and is configured to slide with respect to the body 130 along the axis X103, being guided by the central channel 133 for the sliding. The piston 150 slides between a closed position, so as to obtain the closed configuration of the valve 103, and an open position, so as to obtain the open configuration of the valve 103 shown in FIG. 4.

The piston 150 advantageously comprises, successively along the axis X103, a distal head 151, a rod 152, a collar 155 and a proximal baseplate.

The piston 150 emerges from the central channel 133, at the channel distal end 136, into the chamber 125. The head 151 is arranged in the chamber 125. In the open position of the piston 150, in order to allow the flow F121 to circulate, the head 151 being distant from the seat 127. In the closed position of the piston 150, the head 151 abuts axially against the seat 127 in order to close the channel 122 and prevent the circulation of the flow F121.

The rod 152 connects the head 151 to the collar 155, through the channel distal end 136, of the intermediate chamber 137 of the command chamber 138. Preferentially, the piston 150 is guided in sliding by radial sliding of the rod 152 along a wall of a channel formed by the intermediate chamber 137 coaxially with the axis X103.

The rod 152 is linked to the collar 155 in the command chamber 138. The collar 155 links the rod 152 to the proximal baseplate, separating the command chamber 138 from the proximal chamber 139.

The proximal baseplate, formed at a proximal end of the piston 150, is opposite the distal head 151. The proximal baseplate is arranged in the proximal chamber 139.

The valve 103 advantageously comprises sealing devices 174, 175 and 176. Each sealing device 174, 175 and 176 extends radially between the channel 133 and the piston 150, in order to fluidically separate the chambers 125, 137, 138 and 139.

The sealing device 174, called a "piston sealing device", is herein in the form of a wiper seal, attached to the body 130 and sliding along the piston 150. The device 174 surrounds the rod 152 throughout the periphery thereof and is interposed radially between the piston 150 and the channel 133. More particularly, the device 174 radially links the piston 150 to the body distal end 131. Herein, the device 174 is attached to the body distal end 131, and the rod 152 of the piston slides inside the device 174.

The sealing device 174 fluidically separates the chamber 125 from the channel 133, which are adjacent to the sealing device 174. More particularly, the sealing device 174 separates the chambers 125 and 137 which are adjacent thereto. The pressurized fluid, herein the coating product, taken into the chamber 125, is prevented from leaking towards the intermediate chamber 137 by means of the sealing device 174.

The sealing device 175, called a "piston sealing device", is herein in the form of a wiper seal, attached to the body 130 and sliding along the piston 150. The device 175 surrounds the piston 150 throughout the periphery thereof and is interposed radially between the piston 150 and the body 130, more particularly the channel 133. More particularly, the device 175 radially connects the rod 152 to a part of the channel 133 located at the intersection between the intermediate chamber 137 and the command chamber 138. The sealing device 175 fluidically separates the chambers 137 and 138 from the channel 133, which are adjacent to the sealing device 175.

The sealing device 176 is herein in the form of a wiper seal, attached to the piston 150 and sliding along the body 130. The device 176 surrounds the piston 150 throughout the periphery thereof and is interposed radially between the piston 150 and the body 130, more particularly the channel 133. More particularly, the device 176 radially connects the collar 155 to a part of the channel 133 located at the intersection between the command chamber 138 and the proximal chamber 139. The sealing device 176 fluidically separates the chambers 138 and 139 from the channel 133, which are adjacent to the sealing device 176.

The valve 103 advantageously comprises a spring 154, represented symbolically, which exerts an elastic return force E154 on the piston 150, by means of the proximal baseplate, bearing on the body 130. The elastic return force E154 tends to move the piston 150 from the open position thereof to the closed position thereof. Preferentially, the spring 154 is arranged in the proximal chamber 139, in the same way as the spring 54.

The channel 123 and the command chamber 126 are fluidically connected to the command chamber 138 formed inside the body 130, via one or a plurality of channels (not shown) provided in the body 130 and connecting the chambers 126 and 138 when the valve 103 is mounted. The command fluid F123 can thus enter the command chambers 126 and 138, and thereby exert a pressure force E138 on the collar 155 by pressurizing the chamber 138, tending to move the piston 150 from the closed position to the open position. The application of the force E38 thus serves to poppet the valve 103. The command fluid received in the command chamber 38 is prevented from leaking to the outside 124 by means of the sealing device 176 and to the intermediate chamber 137 by means of the sealing device 175.

Preferentially, the peripheral chamber 128 is fluidically connected to the intermediate chamber 137, delimited inside the body 130. For this purpose, the body 130 provides one or a plurality of channels (not shown), connecting the chambers 128 and 137 when the valve 103 is mounted on the base 102.

The intermediate chamber 137, the peripheral chamber 128 and the channel or channels connecting the two chambers then together form a vent chamber. Indeed, in the event of failure of one of the sealing devices 171 or 174, pressurized fluid, namely coating product, coming from the chamber 125, leaks into the vent chamber. In the event of failure of the device 171, or incorrect mounting of the body 130 in the bore 120, the coating product leaks into the chamber 137, i.e. into the vent chamber. In the event of failure of the device 174, the coating product leaks into the chamber 128, i.e. into the vent chamber. Similarly, in the event of failure of one of the sealing devices 172 and 175, pressurized fluid, namely command fluid, coming from one of the command chambers 126 and 138 leaks into the vent chamber. In the event of failure of the device 175, the command fluid leaks into the chamber 137 belonging to the vent chamber. In the event of failure of the device 172, or of incorrect mounting of the body 130 in the bore 120, the command fluid leaks into the chamber 128 belonging to the vent chamber.

Contrary to the embodiment of FIGS. 1 to 3, for the apparatus 101, a receiving port 158 is provided for receiving the indicator 8, arranged in the base 102 rather than in the valve 103. The port 158 opens to the outside 124 and is not coaxial with the axis X103. The receiving port 158 is designed to receive the indicator 8 in a fixed way, the tube 80 being fixedly received in a port 158, so as to be fixedly rigidly attached to the base 102. To attach the tube 80, the receiving port 158 supports a secondary means of attachment 159, herein an internal thread, cooperating with the primary means of attachment 88 of the tube 80. The connection opening 81 is oriented towards the bottom of the receiving port 158 whereas the external opening 82 is oriented towards the outside 124, and preferentially opens from the base 102, to the outside 124.

The base 102 advantageously comprises a through internal channel 160 which connects the bottom of the receiving port 158 to the peripheral chamber 128, i.e. to the vent chamber. In the event of a leak of pressurized fluid in the vent chamber, the resulting overpressure is transmitted to the poppet 90 via the channel 160.

For such embodiment, a position poppet 197 is mounted on the proximal baseplate of the piston 150, and is visible from outside the valve 103, so as to indicate the current position of the piston 150 to a person. For such embodiment, the poppet 197 is thus distinct from the indicator 8.

Any feature described hereinabove for one of the embodiments or one of the variants apply to the other embodiments and variants described hereinabove, insofar far as is technically possible.

What is claimed is:

1. An indicator for indicating an occurrence of a leak of pressurized fluid in a vent chamber of a pressurized fluid apparatus, the indicator comprising:

a support tube, comprising:

a connection opening, configured to be fluidically connected to the vent chamber of the pressurized fluid apparatus; and an external opening, configured to open out to an outside of the pressurized fluid apparatus; and a poppet, arranged in the support tube and movable with respect to the support tube, between an initial position and a signaling position, under the effect of an overpressure occurring at the connection opening, compared with the external opening, the poppet being positioned further away from the connection opening in the signaling position than in the initial position, to indicate the occurrence of the leak of pressurized fluid into the vent chamber when the poppet is in the signaling position; and locking elements for mechanically locking the poppet in position with respect to the support tube when the poppet is in the signaling position, wherein the locking elements comprise:

an inner wall portion of the support tube; and an external wall portion of the poppet;

wherein the internal wall portion of the support tube and the external wall portion of the poppet are shaped such that the external wall portion of the poppet is received in conical engagement in the internal wall portion of the support tube when the poppet is in the signaling position to thereby lock the poppet in the signaling position.

2. The indicator according to claim 1, wherein the poppet comprises a signaling end that:

protrudes out of the external opening when the poppet is in the signaling position, to indicate the occurrence of the leak; and is at least partially retracted into the external opening when the poppet is in the initial position, to indicate an absence of leak of pressurized fluid into the vent chamber.

3. The indicator according to claim 1, wherein the poppet is shaped for closing the support tube and thereby preventing any leak of pressurized fluid from the connection opening to the external opening, at least when the poppet is in the signaling position.

4. The indicator according to claim 3, wherein the poppet is shaped for closing the support tube and thereby preventing any leak of pressurized fluid from the connection opening to the external opening also when the poppet is in the initial position.

5. The indicator according to claim 1, wherein:

the support tube comprises a primary axial surface oriented towards the connection opening and arranged inside the support tube, between the external opening and the connection opening; and the poppet comprises a secondary axial surface oriented towards the primary axial surface, so that the poppet abuts against the support tube when the poppet is in the signaling position, by abutting the secondary axial surface against the primary axial surface.

6. The indicator according to claim 1, wherein the support tube is configured for the indicator to be fixedly received in a receiving port of the pressurized fluid apparatus.

7. The indicator according to claim 6, wherein the support tube comprises an external thread.

8. A pressurized fluid apparatus comprising:

the indicator according to claim 1, wherein the external opening of the indicator comes out to the outside;

the vent chamber, the connection opening of the indicator being fluidically connected to the vent chamber;

at least one pressurized fluid chamber; and at least one sealing device, fluidically separating the vent chamber from the at least one pressurized fluid chamber.

9. The pressurized fluid apparatus according to claim 8 further comprising a valve fluidically connected to the vent chamber or forming all or part of the vent chamber, wherein the valve comprises:

a body, having a body distal end and forming a central channel, coaxially letting though a central axis, the central channel having a channel distal end which comes out at the body distal end; and a piston, received in the central channel and configured to slide with respect to the body along the central axis and emerging out of the central channel at the distal end of the channel.

10. The pressurized fluid apparatus according to claim 9, wherein:

the central channel comprises an intermediate chamber which is fluidically connected to the vent chamber or which forms all or part of the vent chamber; and the at least one sealing device comprises at least one piston sealing device, belonging to the valve, the piston sealing device radially connecting the piston to the body, so that the piston sealing device separates the intermediate chamber with respect to the at least one pressurized fluid chamber.

11. The pressurized fluid apparatus according to claim 9 further comprising a base that comprises a bore to which the body is received and fixedly attached to form:

the at least one pressurized fluid chamber, delimited by the bore and the valve; and a peripheral chamber, defined by the bore and the body, radially with respect to the central axis, the peripheral chamber being adjacent to the pressurized fluid chamber and being fluidically connected to the vent chamber or forming all or part of the vent chamber; and the at least one sealing device comprises a body seal interposed between the body and the base such that the body sealing device separates the peripheral chamber with respect to said at least one pressurized fluid chamber.

12. The pressurized fluid apparatus according to claim 11, wherein the indicator is mounted in the base, with the support tube fixedly attached to the base.

13. The pressurized fluid apparatus according to claim 9, wherein the indicator is mounted on the valve, with the support tube fixedly attached to the valve.

14. The pressurized fluid apparatus according to claim 13, wherein the indicator is mounted on the piston, with the support tube fixedly attached to a proximal baseplate belonging to the piston, the proximal baseplate being opposite the distal end of the body, such that the indicator is visible from the outside for at least one position of the piston with respect to the body and such that the position of the indicator with respect to the body reflects the position of the piston.

15. The pressurized fluid apparatus according to claim 8, wherein:

the pressurized fluid apparatus is an apparatus for applying a coating product; and the pressurized fluid comprises the coating product and/or a valve command fluid.

16. The pressurized fluid apparatus according to claim 8, wherein:

the indicator comprises a sensor, a state of which reflects the current position of the poppet with respect to the support tube; and the pressurized fluid apparatus comprises an electronic monitoring unit to which the sensor is connected, and which is configured to issue an alert for the attention of a person when the state of the sensor reflects that the poppet is in the signaling position.

* * * * *